United States Patent
Smith et al.

(10) Patent No.: US 11,762,543 B2
(45) Date of Patent: Sep. 19, 2023

(54) SYSTEMS AND METHODS FOR MANAGING GRAPHICAL USER INTERFACES FOR VEHICLE GUIDANCE

(71) Applicant: Honeywell International Inc., Morris Plains, NJ (US)

(72) Inventors: Steven Smith, Surprise, AZ (US); Susan McCullough, Phoenix, AZ (US); David McGloughlin, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 85 days.

(21) Appl. No.: 16/697,968

(22) Filed: Nov. 27, 2019

(65) Prior Publication Data

US 2020/0201528 A1 Jun. 25, 2020

Related U.S. Application Data

(60) Provisional application No. 62/784,169, filed on Dec. 21, 2018.

(51) Int. Cl.
*G06F 3/04847* (2022.01)

(52) U.S. Cl.
CPC .............................. *G06F 3/04847* (2013.01)

(58) Field of Classification Search
CPC .. G06F 3/04847; B64D 43/00; G08G 5/0052; G08G 5/0021; G01C 23/00
See application file for complete search history.

(56) References Cited

U.S. PATENT DOCUMENTS

| 4,860,007 | A | * | 8/1989 | Konicke | G01C 23/00 73/179 |
| 6,445,984 | B1 | * | 9/2002 | Kellogg | B62D 1/28 318/587 |
| 8,633,913 | B1 | | 1/2014 | Raghu et al. | |
| 9,126,694 | B2 | | 9/2015 | Chandrashekarappa et al. | |
| 9,132,913 | B1 | | 9/2015 | Shapiro et al. | |

(Continued)

OTHER PUBLICATIONS

European Search Report dated Mar. 17, 2020, in counterpart European Patent Application No. 19217755.8 (6 pages).

*Primary Examiner* — Jennifer N Welch
*Assistant Examiner* — Kuang F Chen
(74) *Attorney, Agent, or Firm* — Bookoff McAndrews, PLLC

(57) ABSTRACT

Disclosed are methods, systems, and non-transitory computer-readable medium for managing vehicle guidance using a GUI. One method may include: obtaining flight management system (FMS) data; updating an aircraft configuration state based on the FMS data; obtaining a current mode, active command, and a second command for a guidance panel based on the configuration state; and generating a guidance panel GUI based on the current mode, the active command, and the second command. Another method may include: obtaining vehicle data; updating a vehicle configuration state based on the vehicle data if the vehicle data has updated information; obtaining a current mode, active command, and a second command for a guidance panel of the vehicle based on the vehicle configuration state; generating a guidance panel GUI based on the current mode, the active command, and the second command; and displaying the guidance panel GUI on the guidance panel.

20 Claims, 7 Drawing Sheets

(56) References Cited

U.S. PATENT DOCUMENTS

| | | |
|---|---|---|
| 10,060,747 B2 | 8/2018 | Block et al. |
| 2013/0179009 A1 | 7/2013 | Gershzohn |
| 2014/0053094 A1* | 2/2014 | Grevinga ............ G06F 3/04883 |
| | | 715/771 |
| 2014/0100722 A1* | 4/2014 | Louise .................. B64D 45/00 |
| | | 701/14 |
| 2016/0093223 A1* | 3/2016 | Caudron .................. G01D 7/00 |
| | | 701/3 |
| 2017/0259935 A1 | 9/2017 | Hausmann et al. |
| 2018/0032073 A1* | 2/2018 | Figard ................... G05D 1/101 |
| 2018/0186467 A1 | 7/2018 | Wong et al. |
| 2020/0090523 A1* | 3/2020 | Arnoux ................. G01C 21/20 |

\* cited by examiner

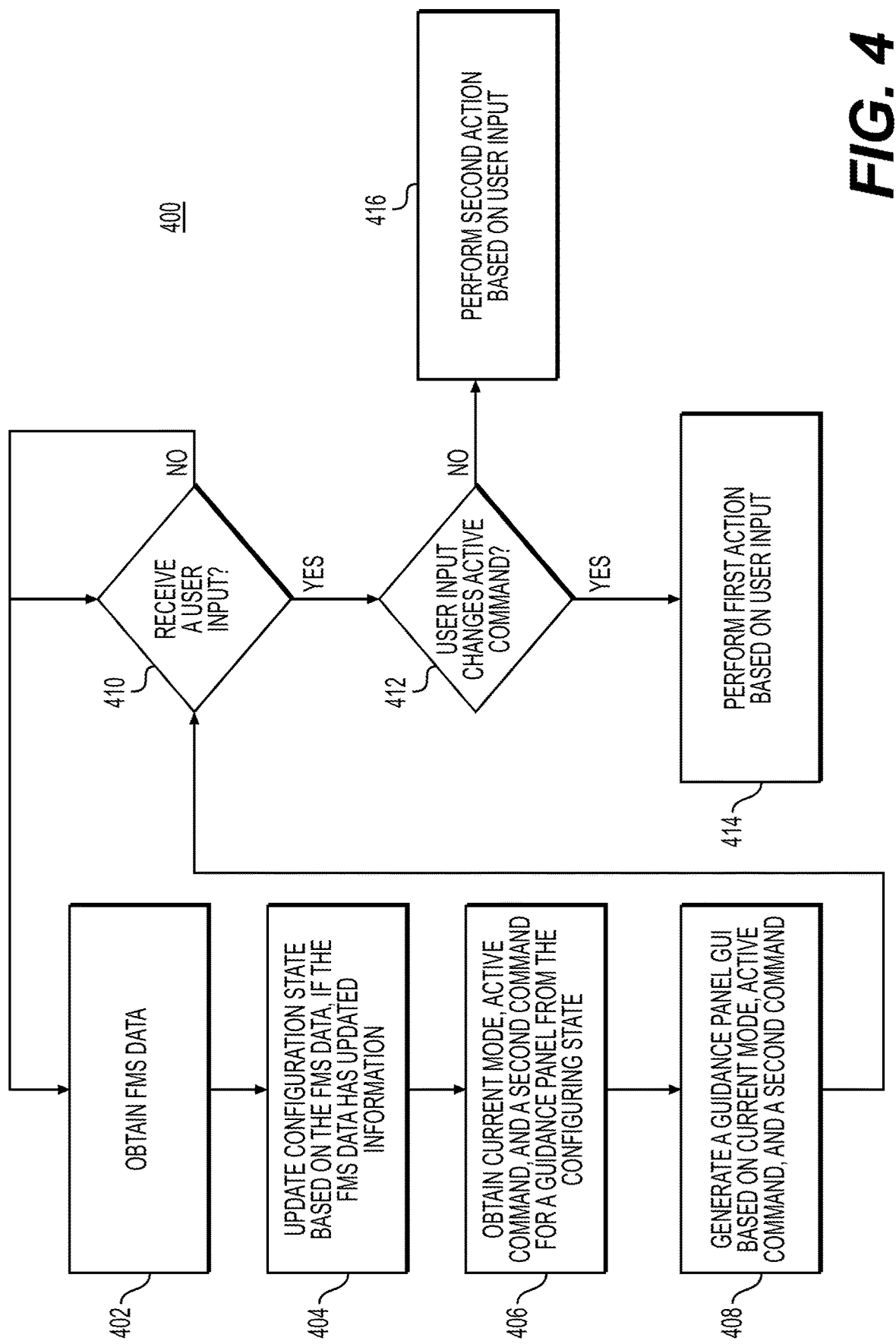

SYSTEMS AND METHODS FOR MANAGING GRAPHICAL USER INTERFACES FOR VEHICLE GUIDANCE

CROSS-REFERENCE TO RELATED APPLICATION(S)

This application claims the benefit of priority to U.S. Provisional Application No. 62/784,169, filed Dec. 21, 2018, which is incorporated herein by reference in its entirety.

TECHNICAL FIELD

Various embodiments of the present disclosure relate generally to systems and methods for managing vehicle guidance and, more particularly, to systems and methods for managing vehicle guidance using a graphical user interface (GUI).

BACKGROUND

Guidance interfaces (e.g., guidance panels) have traditionally been tactical in operation. Guidance panels may enable vehicle operators (e.g., pilots) to select an immediate change in control (e.g. speed, heading, altitude) or, in some cases, may contain and execute on pilot-defined preset values. Furthermore, flight mode annunciators located above the primary flight display may be configured to display the current and armed modes. Various rules may be used to govern transitions between current and armed modes, and those various rules may be aircraft-type dependent. All of the rules may not necessarily be covered in pilot training (e.g., because of accidental omission, rule redundancy, or triggering of rule only in edge cases, or, generally, the complexity of the rules may make the rules not easily understood or trained), or the rules may operate in a counter-intuitive manner from the perspective of a pilot. Furthermore, although many mode annunciations may appear similar on the flight mode annunciator, the modes may produce very different trajectories and/or behaviors. For instance, from the pilot's perspective, there may be no logical reason why adjusting the climb or descent rate on the guidance panel may erase an altitude target.

Therefore, mode errors, either actual mode errors, in which the pilot misunderstands the mode, or assumed mode errors, in which the pilot assumes a mode error has occurred but in fact it has not occurred, have been a suboptimal reality of aerospace vehicle guidance since the advent of complex avionics systems. Some of the most common types of mode errors may be: (1) failing to understand flight control logic in a given mode; (2) failing to recognize automatic (un-commanded) mode transitions; (3) failing to recognize the lifting of flight control protections in a given mode; and/or (4) assuming automation will perform a task when it is not enabled in the current mode; (5) misreading a display because of mode confusion; and/or (6) selecting the wrong descent mode.

Moreover, existing guidance panels may not necessarily communicate an indication of a future mode of the system or possible modes of the system. For example, guidance panels may not necessarily communicate that an automatic change in value and/or mode is/was upcoming; instead, existing guidance panels may only depict the new value once the new value had already changed.

The present disclosure is directed to overcoming one or more of these above-referenced challenges.

SUMMARY OF THE DISCLOSURE

According to certain aspects of the disclosure, systems and methods are disclosed for managing vehicle guidance using a GUI. One method may include: obtaining flight management system (FMS) data; updating an aircraft configuration state based on the FMS data if the FMS data has updated information; obtaining a current mode, active command, and a second command for a guidance panel based on the configuration state; and generating a guidance panel GUI based on the current mode, the active command, and the second command.

Another method may include: obtaining vehicle data; updating a vehicle configuration state based on the vehicle data if the vehicle data has updated information; obtaining, for each of one or more vehicle control variables, a current mode, an active command, and a second command for to be displayed on a guidance panel of the vehicle based on the vehicle configuration state; generating a guidance panel GUI based on the current mode, the active command, and the second command for each of the one or more vehicle control variables; and displaying the guidance panel GUI on the guidance panel.

Moreover, a system may include: a guidance panel; a memory storing instructions; and a processor executing the instructions to perform a process. The process may include: obtaining vehicle data; updating a vehicle configuration state based on the vehicle data if the vehicle data has updated information; obtaining, for each of one or more vehicle control variables, a current mode, an active command, and a second command for to be displayed on the guidance panel of the vehicle based on the vehicle configuration state; generating a guidance panel GUI based on the current mode, the active command, and the second command for each of the one or more vehicle control variables; and displaying the guidance panel GUI on the guidance panel.

Furthermore, a non-transitory computer-readable medium may store instructions that, when executed by a processor, cause the processor to perform a method. The method may include: obtaining vehicle data; updating a vehicle configuration state based on the vehicle data if the vehicle data has updated information; obtaining, for each of one or more vehicle control variables, a current mode, an active command, and a second command for to be displayed on a guidance panel of the vehicle based on the vehicle configuration state; generating a guidance panel GUI based on the current mode, the active command, and the second command for each of the one or more vehicle control variables; and displaying the guidance panel GUI on the guidance panel Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various

FIG. 4 depicts a flowchart for managing vehicle guidance using a GUI, according to one or more embodiments.

DETAILED DESCRIPTION OF EMBODIMENTS

Figure 1:
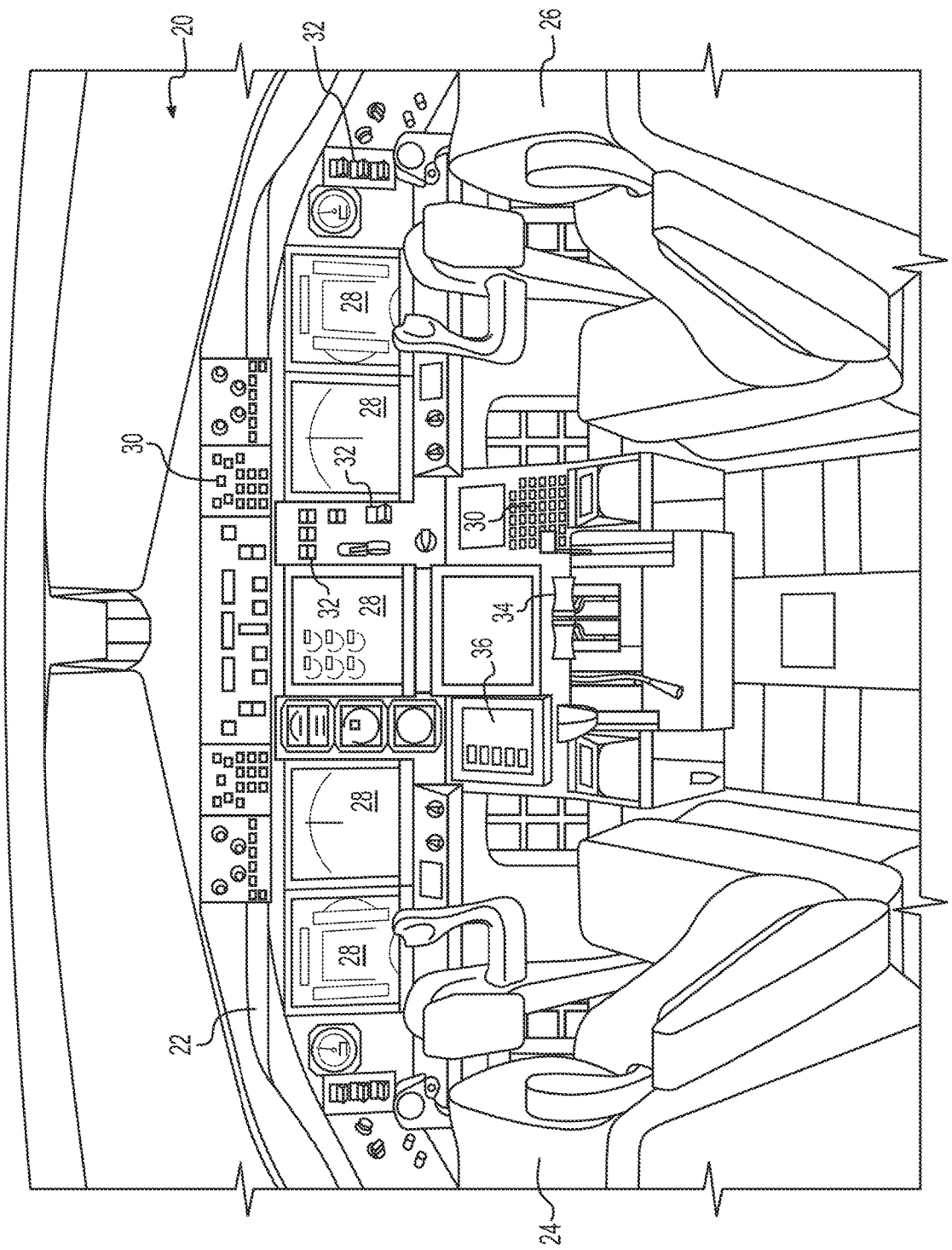
FIG. 1 depicts an exemplary vehicle and/or system environment for managing vehicle guidance using a GUI, according to one or more embodiments.

Various embodiments of the present disclosure relate generally to managing vehicle guidance using a GUI.

In general, the present disclosure is directed to managing vehicle guidance and display of vehicle parameters using a graphical user interface ("GUI"). Specifically, as discussed in detail below, the present disclosure describes a guidance panel configured to display and control a vehicle mode, a current commanded value, and current command logic, as well as future or possible command values and logics. For example, instead of only displaying a current speed command value (e.g., 250 knots), the guidance panel may be configured to display a current speed logic (e.g., takeoff, departure, etc.) as well. Additionally, the guidance panel may also be configured to display upcoming changes in command values (e.g., speed, heading, altitude) and/or upcoming command logics. For example, while the current commanded speed and current speed logic are being displayed, the next commanded speed and speed logic may also be displayed. Therefore, mode errors may be reduced and pilots may quickly make changes to current command values. Furthermore, pilots may assume that a mode error has occurred, while in fact a mode error has not occurred. However, as the guidance panel of the present disclosure may be configured to display and control the vehicle mode, the current commanded value, and the current command logic, as well as the future or the possible command values and logics, the guidance panel may be more informative. As the guidance panel may be more informative, the pilots may be better informed and not assume mode errors have occurred.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

While this disclosure describes the systems and methods with reference to aircraft, it should be appreciated that the present systems and methods are applicable to management of vehicles, including those of drones, automobiles, ships, or any other autonomous and/or Internet-connected vehicle.

Referring now to the appended figures, FIG. 1 depicts an exemplary vehicle and/or system environment for managing vehicle guidance using a GUI, according to one or more embodiments. Specifically, FIG. 1 is a fragmentary perspective view illustrating the inside of an exemplary aircraft cockpit 20. Although the context of the following discussion is with respect to GUIs of touch screen displays used in aircraft, it should be understood that the teachings herein pertain to touch screen displays used in any type of vehicle including, but not limited to, land based vehicles such as automobiles and trains as well as watercraft and spacecraft. Additionally, the teachings herein are not limited to vehicle applications. Rather, the teachings herein may also be used together with touch screen displays that are employed in stationary applications, such as information kiosks, as well as with touch screen displays that are hand held or otherwise not mounted to a surface.

As shown in FIG. 1, aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control touch screen display 36. Moreover, the front displays 28 may also be touch screen displays.

One of the front displays 28 and/or the control touch screen display 36 may be configured to operate as a guidance panel, such as a guidance panel 215 as discussed below with reference to FIG. 2. Specifically, a processor may be configured to execute a guidance panel program (comprised of instructions executable by the processor) that causes the front displays 28 and/or control touch screen display 36 to display a guidance panel consistent with the presently disclosed embodiments. For instance, the guidance panel 215 may be configured to include one or more GUIs as disclosed herein (or variations thereof), such as GUI 300A, GUI 300B, GUI 300C, GUI 300D and GUI 200E (as depicted in FIGS. 3A-3E, respectively).

The processor may cause the touch screen to display the guidance panel display by generating images and transmitting the images to the touch screen to be displayed. Alternatively, the processor may generate instructions and information and transmit the instructions and information to a graphics processing unit (GPU). The GPU may generate the images to be displayed on the touch screen. The guidance panel program may be stored in a memory. The memory may be connected to the processor so that the processor may receive stored instructions or data, and the processor may process the instructions, stored data, and received information in accordance with the guidance panel program. The memory and the processor may be connected to the touch screen either directly or indirectly. Collectively the memory, the processor, and the touch screen may be referred to as a "system."

Generally, user inputs may be a touch interaction with the touch screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, as discussed herein. As user inputs may be accomplished with the touch screen, the buttons 30 of the cockpit 20 may be omitted.

In one aspect of the disclosure, user interactions with the touch screen may include a scratch-pad input process. The scratch-pad input process may be performed by a first input and a second user input, as discussed below with respect to FIG. 3E. In one aspect of the disclosure, the first user input and the second user input may be a short touch on a region associated with an icon or a long touch on the region associated with the icon. The short touch may be any touch on the region for more than a minimum amount up to a configurable threshold period of time (e.g., less than one second). The long touch may be any touch for more than a configurable period of time (e.g., more than two seconds) up to a maximum period of time. The period of time for the short touch and the long touch may be the same or the period of time for the short touch may be less than the period of time for the long touch. The first user input and the second user input may instead by one or a combination of: a tap (e.g., a touch on a region of an icon for less than a minimum period of time), a swipe (e.g., a touch on a region of an icon that moves/drags/remains in contact with the touch screen interface from a starting position in the region to an ending position in the region or out of the region by a threshold distance), or multi-finger inputs (e.g., two or more discernable touch points in a region).

Figure 2:
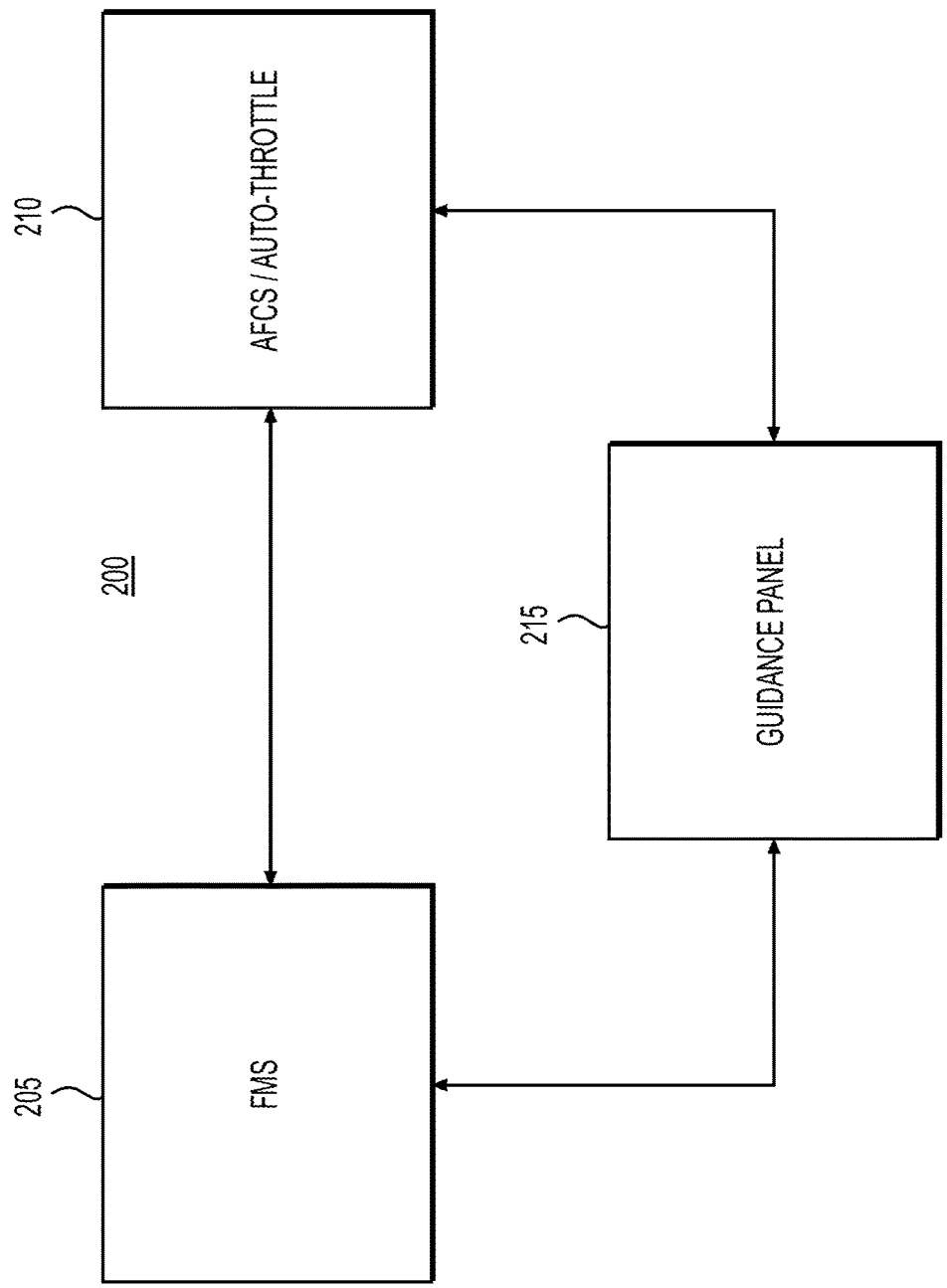
FIG. 2 depicts an exemplary block diagram of a system for managing vehicle guidance using a GUI, according to one or more embodiments.

FIG. 2 depicts an exemplary block diagram of a system 200 for managing vehicle guidance using a GUI, according to one or more embodiments. The system 200 may include a flight management system (FMS) 205, an automated flight control system (AFCS) and/or an auto-throttle 210 (hereinafter referred to as "AFCS 210" or, generally, an automated vehicle control system 210), and/or the guidance panel 215. The FMS 205, the AFCS 210, and the guidance panel 215 may receive and transmit messages and/or packets of information by wired and/or wireless communications between each other. For instance, the FMS 205, the AFCS 210, and the guidance panel 215 may use a data bus, Ethernet cables, and/or Wi-Fi using corresponding standards and network interfaces to receive and transmit the messages and/or packets of information.

The FMS 205 may be any type of computer that acts as a type of navigation equipment, and may be configured for receiving input data from a variety of other navigational instruments. Other navigational instruments may include aircraft sensors, such as inertial navigation instruments, radio navigational instruments, including one or more very high frequency omnidirectional radio range (VOR) systems, and a global positioning system (GPS). The aircraft sensors may generate various data, including altitude data, heading data, air data reference, radar altimeter data, etc. Using this data and/or data from the GPS, the FMS 205 may generate position information, and may further engage in in-flight management of a flight plan, which may be stored in a memory, such as a FMS database (or database of vehicle). Using FMS database data, the FMS 205 may calculate a course for the aircraft to follow, including a lateral flight plan and/or a vertical flight plan.

The FMS 205 may be configured to transmit FMS data (or, in the case of a vehicle other than aircraft, "vehicle data") to the AFCS 210 and/or the guidance panel 215. The FMS data may include FMS speed data, FMS lateral data, and/or FMS vertical data. The FMS speed data may include one or a combination of speed mode, CAS target, CAS target valid indicator, mach target, mach target valid indicator, speed transition alert, next CAS target, next CAS target valid indicator, next mach target, and/or next mach target valid indicator. The FMS lateral data may include one or a combination of active waypoint ID, desired track, distance to go, lateral navigation (LNAV) armed, LNAV captured, LNAV valid, roll command, next target course, and/or next waypoint. The FMS vertical data may include one or a combination of vertical Mode request, vertical speed target, vgp capture, vgp vertical deviation, VNAV AFCS engage, next vertical mode, next vertical speed target, vertical flight path angle, and/or pfd VNAV alt alert (30 second notice). The FMS data may also include one or more leg(s) of a FMS Course, for both vertical and lateral movement. In the case of a vehicle other than aircraft, the vehicle data may include current and target speed/velocity, waypoints, and travel route.

The AFCS 210 may be configured to compute control inputs to fly the aircraft along the desired course, as indicated by the FMS data. The AFCS 210 may provide the control inputs to flight controls to control position, speed, and direction (lateral, vertical, and/or orientation) of the aircraft. For instance, the AFCS 210 may obtain flight path data. The flight path data may include radio/radar signals, directional and vertical references, air data pitotstatic, computed flight path data, and/or user inputs. The AFCS 210 may use the flight path data to automatically control the flight path of the aircraft through adjustment to the pitch/roll/yaw axis or wing lift characteristics, to coordinate the aircraft's position, speed, and direction to match the course. The AFCS 210 may provide visual cues for flight path guidance. The AFCS 210 may control power source devices, interlocking devices, and amplifying, computing, integrating, controlling, actuating, indicating and warning devices such as computers, servos, control panels, indicators, warning lights, etc. In the case of a vehicle other than aircraft, the automated vehicle control system 210 may compute control inputs to travel the vehicle along a desired travel path in accordance with the current and target speed/velocity, waypoints, and travel route of the vehicle data.

The auto throttle of AFCS 210 may provide throttle adjustments to meet speed targets. For instance, the auto-throttle may automatically control the position of the aircraft's throttles, such as the throttle controls 34, to properly manage engine power during all phases of flight/attitude.

The guidance panel 215 may control how the FMS 205 and the AFCS 210 interact by executing the guidance panel program. For instance, the guidance panel program may control a configuration state for how the FMS 205 and the AFCS 210 interact, based on guidance panel rules. The guidance panel program may store the configuration state and the guidance panel rules in the memory.

The configuration state may be a file or object that stores current modes, current command values, current command logics, future command values (including next command values), future command logics (including next command logics), possible command values, and/or possible command logics (collectively "commands"). The current command values, current command logics may be command values and/or command logics for a current waypoint/phase of flight of a flight plan (as indicated by the FMS data). The future command values and/or the future command logics may be command values and/or command logics for future waypoint/phase of flight of a flight plan (as indicated by the FMS data), where "future" means in order from a present moment to and end of the flight plan. The commands may be based on the FMS data and/or user input. Specifically, the configuration state may be updated based on updates to the FMS data from the FMS 205 and changes as indicated by the user inputs. The guidance panel rules may control what is displayed in the guidance panel display, based on the configuration state. Specifically, the guidance panel program may display the guidance panel display to depict a current configuration state, and receive user inputs to view and/or change the current configuration state, as discussed herein. Based on the configuration state and the guidance panel rules, the guidance panel program may control what command values and/or modes (from among FMS command values from the FMS 205, user-input command values, FMS modes, or user-input modes) are input to the AFCS 210.

Figure 3A:
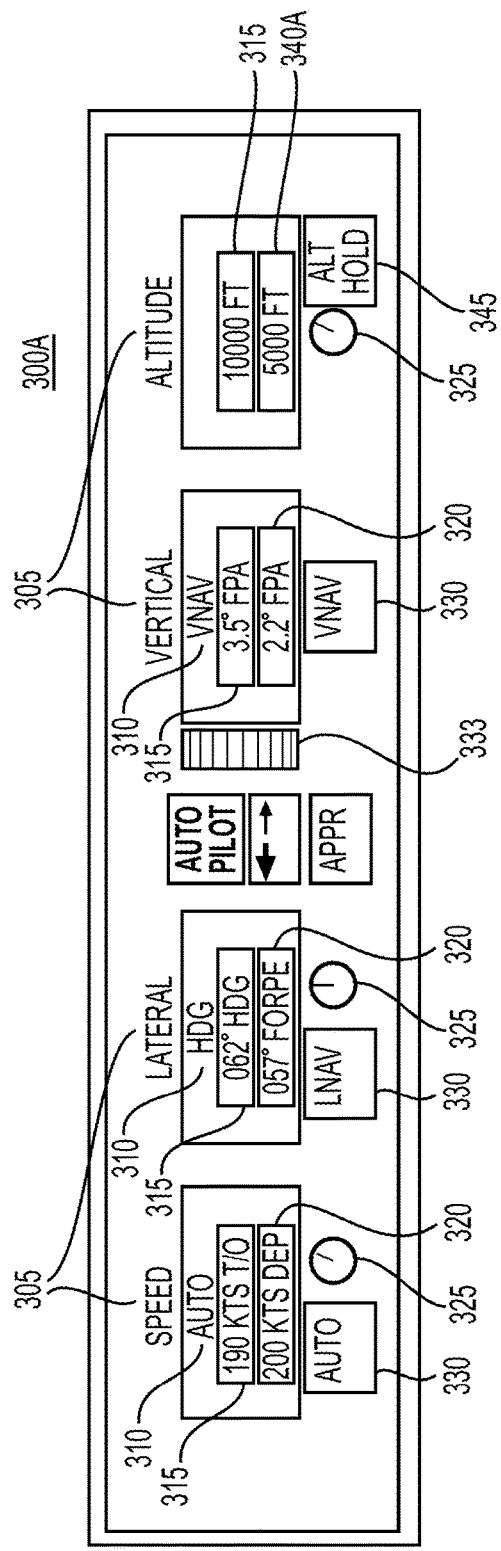
FIGS. 3A-3E depict example GUIs for managing vehicle guidance, according to one or more embodiments.

Generally, the guidance panel display may include a guidance ribbon that has one or more guidance sections. The one or more guidance sections may correspond to vehicle control variables. For instance, the vehicle control variables may include speed, lateral, vertical, and/or altitude for an aircraft; speed and/or heading for a watercraft/land craft not a track/road; and speed for a land craft on a track/road. The guidance ribbon may have a guidance section for each vehicle control variable. For instance, as depicted in GUIs 300A, 300B, 300C, and 300D for aircraft, the guidance ribbon may include a section for each of the vehicle control variables. For instance, the sections may include a speed guidance section, a lateral guidance section, a vertical guidance section, and/or an altitude guidance section (collectively "sections"). Each of the sections may be associated with a region of the touch screen. The region may be of a generally rectangular shape; however, any polygonal shape may be defined to correspond to the icon for touch input purposes. The sections/regions for sections may be adjacent to each other in a horizontal direction (one edge to another edge of the GUI, as depicted in FIG. 3A). However, the sections/regions for sections may be adjacent to each other in a vertical direction, or arranged in a grid pattern. The arrangement of sections/regions for sections may be configurable based on user inputs, so that the order of sections may be re-arranged.

FIGS. 3A-3E depict GUIs for managing vehicle guidance, according to one or more embodiments. FIG. 3A depicts the GUI 300A. As depicted in GUI 300A, and generally, the sections may include a label 305, a mode 310, an active command 315, and/or a second command 320. More generally, at least one section (up to all sections) may include the active command 315 and the second command 320, while remaining sections may include the active command 315 without the second command 320. For instance, the at least one section may be determined based on the FMS data, phase of flight, current waypoint, action to be taken from a checklist program, or state of the aircraft as based on the flight path data. Alternatively, the at least one section may be determined based on a comparison between the current command value and a future command value, and the second command may be displayed only if the comparison indicates a change is more than (or equal to) a threshold amount. Alternatively, the second command 320 may only be displayed for the speed guidance section, for the lateral guidance section, or for the vertical guidance section, based on settings for the guidance panel, which may be set by the user of the aircraft. Alternatively, the second command 320 may only be displayed for two out of a set including the speed guidance section, the lateral guidance section, and the vertical guidance section, based on the settings for the guidance panel, which may be set by the user of the aircraft. One or more sections may also include a selector 330/345, a manual value controller 325/333, and/or an indicator 340A/340B (see GUI 300B of FIG. 3B).

For any given section, the label 305, the mode 310, the active command 315, and the second command 320 may be adjacent to each other in an ordered sequence in a vertical direction, such that the label 305 is above the mode 310, the mode 310 is above the active command 315, and the active command 315 is above the second command 320. However, the label 305, the mode 310, the active command 315, and the second command 320 may instead be adjacent to each other in an ordered sequence in a horizontal direction. Moreover, the active command 315 and the second command 320 may be depicted (as in FIG. 3A) in separate rectangular boxes, with the active command 315 above the second command 320. Alternatively, the active command 315 and the second command 320 may be depicted in separate rectangular boxes, with the second command 320 above the active command 315. Alternatively, the active command 315 and the second command 320 may be in a shared rectangular box and separated by a vertical and/or horizontal space (e.g., in different rows in the vertical direction and/or different columns in the horizontal direction).

Furthermore, the label 305, the mode 310, the active command 315, and the second command 320 may be depicted in different colors, based on a current mode of a section. For instance, if a mode of a section is manual, the label 305, the mode 310, and the active command 315 may be a first color (e.g., green); if the mode of the section is auto, the label 305, the mode 310, and the active command 315 may be a second color (e.g., magenta); the second command 320 may be a third color (e.g., cyan). The selector 330/345 and/or the manual value controller 325/333 may also be depicted in different colors to correspond to the first color, the second color, or the third color. For instance, the selector 330/345 may match the second color if the section is in auto (e.g., to indicate that the system is already in auto), the selector 330/345 may match the third color if the section is in manual (e.g., to indicate the user can change to auto by selecting the selector 330/345), and the manual value controller 325/333 may match the first color if the section is in manual.

The label 305 may be a text-string that corresponds to the section. For instance, the label 305 may be "Speed" for the speed guidance section, "Lateral" for the lateral guidance section, "Vertical" for the vertical guidance section, or "Altitude" for the altitude guidance section.

The mode 310 may be a text-string that corresponds to a current mode of the section. For instance, the mode 310 may be automatic (e.g., displayed as "AUTO" or "manual" (or "MAN") for the speed guidance section, "LNAV" or "HDG"/"TRK" for the lateral guidance section, or "VNAV" or "manual" (or "MAN") for the vertical guidance section. AUTO, LNAV, and VNAV may correspond to automated modes generated by the FMS 205. MAN, HDG, and TRK may correspond to manual modes. The guidance panel program may use the guidance panel rules to access the configuration state, retrieve the current mode for the section from the configuration state, and display a corresponding text-string, such as "AUTO" or "MAN" for the speed guidance panel. The current mode of the section may be set by user inputs. For instance, the user may select the selector 330/345 (if in manual mode) to change from manual mode to the automated mode, to arm the second command 320 as discussed below. Furthermore, the user may select a change in a current command value to change from the automated mode to a manual mode (or to change the manual mode). To select the change in the current command value, the user may perform the scratch-pad input process or adjust a physical or virtual knob (such as the manual value controller 325/333). When the user adjusts the physical or virtual knob (in the automated mode) by a first amount, the mode may change to the manual mode with a same command value, and further adjustments to the physical or virtual knob may change the command value accordingly (e.g., linearly, proportionally, etc.). Alternatively or additionally, the current command value may be changed by applying a command value from a datalink.

The active command 315 may be a text-string that corresponds to a current command value and/or a current command logic of the section. For instance, the active command 315, for the speed guidance section, may be a current command value for speed in knots or mach speed and/or a current command logic indicating a phase of flight (e.g., take off (T/O), departure, etc.). The active command 315, for the lateral guidance section, may be a current command value for a leg of the FMS Course and/or heading in degrees, and/or a current command logic indicating a waypoint (e.g., "FORPE"). The active command 315, for the vertical guidance section, may be a current command value for a leg of the FMS Course, level flight, or ascent/descent in degrees, and/or a current command logic indicating level flight or flight path angle ("FPA"). The active command 315, for the altitude guidance section, may be a current command value for altitude in feet, meters, kilometers, etc.

The guidance panel program may use the guidance panel rules to access the configuration state, retrieve the current command value, and/or the current command logic for the section from the configuration state, and display a corresponding text-string, such "190 KTS T/O" for the speed guidance panel. The current command value and/or the current command logic of the section may be set by user inputs. For instance, the user may select the selector 330/345 (if in manual mode) to change from manual mode to the automated mode, and/or to arm the second command 320, as discussed below. Furthermore, the user may select a change in the current command value to change from the automated command value to a manual command value (or to change the manual command value). To select the change in the current command value, the user may perform the scratch-pad input process or adjust a physical or virtual knob (such as the manual value controller 325/333). When the user adjusts the physical or virtual knob (in the automated mode) by a first amount, the mode may change to the manual mode with a same command value, and further adjustments to the physical or virtual knob may change the command value accordingly (e.g., linearly, proportionally, etc.). Alternatively or additionally, the current command value may be changed by applying a command value from a datalink.

The selector 330/345 may trigger a change in mode and/or in current command value. For instance, if a guidance section is in a manual mode, and the user selects the selector 330, the manual mode may be changed to an automated mode. Alternatively, if a guidance section is in an automated mode or manual mode, and an alternative command value is suggested, and the user selects the selector 330, the alternative command value may be selected as the current command value. The selector 330 for the speed guidance section, the lateral guidance section, and the vertical guidance section may engage the automated mode when the user selects the selector 330. The selector 345 for the altitude guidance section may instead engage an altitude hold process when the user selects the selector 345. The user selection of the selector 330/345 may be performed by a user input on a region associated with the selector 330/345, by a user input on a physical button, by a user input selecting the selector 330/345, and/or by a mouse or keyboard interaction.

The manual value controller 325/333 may perform a command value adjustment by a virtual knob, slider, scroll, rotate, swipe input, or other adjustments. Alternatively or additionally, the manual value controller 325/333 may be linked to the scratch-pad input process, as discussed below with respect to FIG. 3E.

Alternatively or additionally, the manual value controller 325/333 may be linked to a physical knob/wheel/slider (e.g., linked one to one, or linked one to many). For instance, the user may select the manual value controller 325/333 by a user input (e.g., a tap), which may activate a physical knob/wheel/slider that, when adjusted by the user, may adjust the current command value; otherwise, the physical knob/wheel/slider may not adjust the current command value. The physical knob/wheel/slider may be activated for a set period of time, or may be active until the user inputs another user input on the manual value controller 325/333 (or on another of the manual value controller 325/333, thereby switching which command value is to be changed).

The second command 320 may be an anticipated command, an armed command, or a possible command. In one aspect of the disclosure, the second command 320 may be the anticipated command or the armed command, based on a current mode of a section. An anticipated command may be a next command value and/or a next command logic for the guidance section based on the FMS data. An armed command may be a current command value and/or a current command logic for the guidance section based on the FMS data.

Specifically, the guidance panel program may use the guidance panel rules to access the configuration state, retrieve the current and/or next command value and/or the current and/or next command logic for the section from the configuration state, and display a corresponding text-string, such "200 KTS DEP" for the speed guidance panel. The guidance panel program may select the current command value and/or the current command logic based on the FMS data if the guidance section is in manual mode, or select the next command value and/or next command logic based on the FMS data if the guidance section is in automated mode.

For instance, for the speed guidance section, if the mode of the speed guidance section is manual, then: (1) the mode 310 may indicate "MAN"; (2) the active command 315 may indicate a current command value and/or current command logic (i.e., "MAN") as set by the user; and (3) the second command 320 may be an armed command corresponding to the current command value and/or the current command logic for the speed guidance section based on the FMS data. Alternatively, if the mode of the speed guidance section is AUTO then: (1) the mode 310 may indicate "AUTO"; (2) the active command 315 may indicate a current command value and/or the current command logic for the speed guidance section based on the FMS data; and (3) the second command 320 may be an anticipated command corresponding to a next command value and/or a current command logic for the speed guidance section based on the FMS data.

For the lateral guidance section, if the mode of the lateral guidance section is manual, then: (1) the mode 310 may indicate "HDG"; (2) the active command 315 may indicate a current command value and/or current command logic (i.e., "HDG") as set by the user; and (3) the second command 320 may be an armed command corresponding to the current command value and/or the current command logic for the lateral guidance section based on the FMS data. Alternatively, if the mode of the lateral guidance section is AUTO, then: (1) the mode 310 may indicate "LNAV"; (2) the active command 315 may indicate a current command value and/or the current command logic for the lateral guidance section based on the FMS data; and (3) the second command 320 may be an anticipated command corresponding to a next command value and/or a current command logic for the lateral guidance section based on the FMS data.

For the vertical guidance section, if the mode of the vertical guidance section is manual, then: (1) the mode 310 may indicate "MAN"; (2) the active command 315 may indicate a current command value and/or current command logic (i.e., "MAN") as set by the user; and (3) the second command 320 may be an armed command corresponding to the current command value and/or the current command logic for the vertical guidance section based on the FMS data. Alternatively, if the mode of the vertical guidance section is AUTO then: (1) the mode 310 may indicate "VNAV"; (2) the active command 315 may indicate a current command value and/or the current command logic for the vertical guidance section based on the FMS data; and (3) the second command 320 may be an anticipated command corresponding to a next command value and/or a current command logic for the vertical guidance section based on the FMS data.

As discussed above, in this aspect of the disclosure, the second command 320 may display the anticipated command or the armed command. In contrast, and as discussed above, existing guidance panels may not necessarily communicate an indication of a future mode of the system or possible modes of the system. For example, guidance panels may not necessarily communicate that an automatic change in value and/or mode is/was upcoming; instead, existing guidance panels may only depict the new value once the new value had already changed. In further contrast, and also discussed above, flight mode annunciators located above the primary flight display may be configured to display the current and armed modes. However, as the second command 320 may display the anticipated command or the armed command adjacent to the active command 315, the guidance panel may be more informative, the pilots may be better informed and not assume mode errors have occurred, mode errors may be reduced, and/or pilots may quickly make changes to current command values/modes.

In one aspect of the disclosure, the second command 320 may be the possible command, and the possible command may indicate that an intercept is imminent but not armed. Specifically, the possible command may correspond to a command value that would be a desirable command value but one that is not currently armed. The guidance panel program may include situational rules. The situational rules may compare current command values (e.g., user input command values) to standard command values for a situation (e.g., phase of flight, current waypoint, action to be taken from a checklist program, or state of the aircraft as based on the flight path data), and determine that a current command value or values are more than a threshold difference from the standard command values. The situational rules and the standard command values may be defined by original equipment manufacturers (OEM) and/or may be modified by owners/operators of the aircraft.

In response to determining that the current command values are more than the threshold difference from the standard command values, the guidance panel program may display the second command 320 as the standard command value and/or a command logic. The user may select the second command 320 (e.g., by a user input to a region associated with second command 320 or by a user input to the selector 330/345). In response to the user selection of the second command 320, the guidance panel program may change the current command value to the standard command value.

For instance, on an approach, the user may have manually selected a speed of 210 knots, but the guidance panel program may compare the speed to a standard speed of 180 knots, and determine that the current command value (210 knots) is more than a threshold difference (e.g., 10 knots) of the standard command value (180 knots). In response, the guidance panel program may display the second command 320 as the command value of 180 knots and/or a command logic indicating the situation. Therefore, the guidance panel program may recognize that it would be prudent to be at a slower speed, and notify the user of a standard speed.

In one aspect of the disclosure, the second command 320 may flash on and off to indicate that the anticipated command (when displayed) is soon to engage, or to indicate the armed or possible command (when displayed) is soon to not be relevant (or changed to a different armed or possible command). The rate of the flashing of the second command may be inversely proportional to the amount of time, distance, altitude, etc. until the anticipated command (when displayed) is to be engaged or the armed or possible command (when displayed) is soon to not be relevant (or changed to a different armed or possible command). Alternatively or additionally, the second command 320 may pulsate by fading in/fading out to indicate that the anticipated command (when displayed) is soon to engage, or to indicate the armed or possible command (when displayed) is soon to not be relevant (or changed to a different armed or possible command). The rate of the pulsating of the second command may be inversely proportional to the amount of time, distance, altitude, etc. until the anticipated command (when displayed) is to be engaged or the armed or possible command (when displayed) is soon to not be relevant (or changed to a different armed or possible command.

Figure 3B:
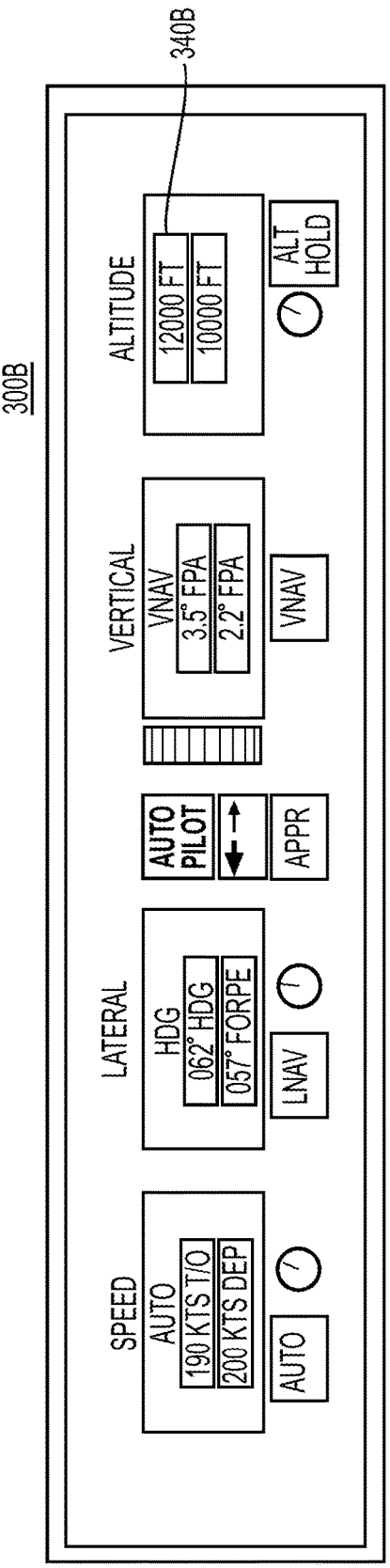

FIG. 3B depicts another embodiment of a GUI 300B consistent with certain additional embodiments of the present disclosure. Specifically, in one embodiment, GUI 300B may be similar to GUI 300A except that GUI 300B may also or alternatively include the indicator 340B instead of only the indicator 340A. Specifically, in one embodiment GUI 300B may include both the indicator 340A, which may indicate a floor requirement, as well as the indicator 340B, which may indicate a ceiling requirement. The floor requirement and/or the ceiling requirement may be based on requirements for the phase of flight, current waypoint, or next waypoint, as indicated by requirements data and the FMS data. The requirements data may be a set of rules for requirements (e.g., speed, altitude, heading, etc.) the aircraft is supposed to adhere to in flight, based on phase of flight and/or waypoint.

The guidance panel program may be configured to retrieve the requirements data, and determine if the aircraft is supposed to adhere to one or more requirements. For instance, the guidance panel program may determine that a current waypoint of the aircraft (e.g., the active Waypoint ID of the FMS data) corresponds to a waypoint in the requirements data, retrieve requirements associated with the waypoint, and determine whether current command values are acceptable based on the retrieved requirements. For instance, a requirement may be that the aircraft must be at least above 5000 feet altitude (as depicted in FIG. 3A) or the requirement may be that the aircraft must be at least below 12000 feet altitude (as depicted in FIG. 3B).

Figure 3C:
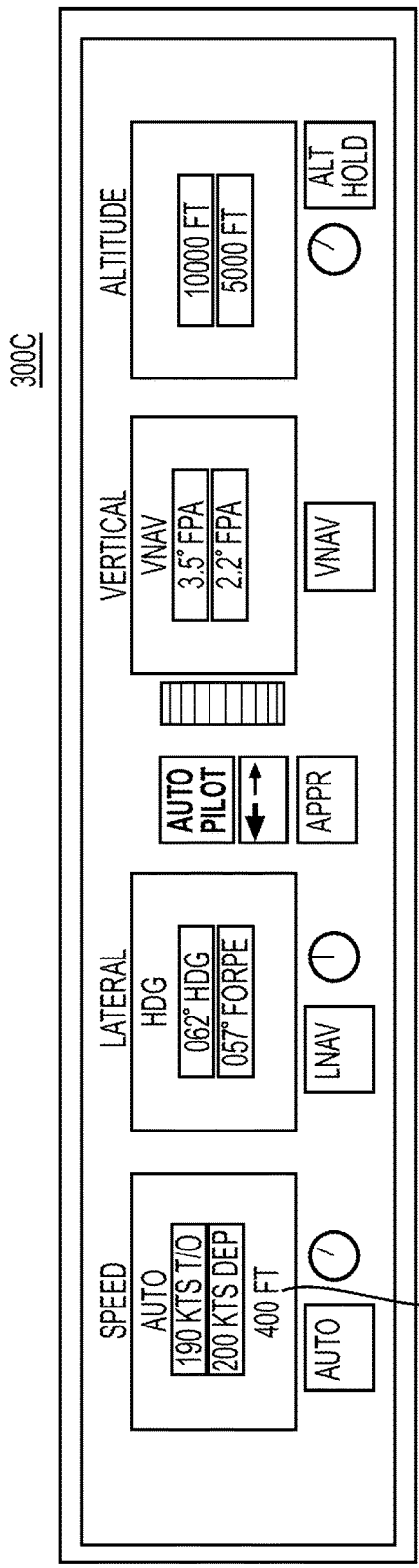

FIG. 3C depicts another embodiment of a GUI 300C consistent with certain additional embodiments of the present disclosure. The GUI 300C may be similar to GUI 300A except that GUI 300C may also or alternatively include a logic trigger indicator 350 associated with one or more of the sections. The logic trigger indicator 350 may indicate the triggering logic for an anticipated command. The logic trigger indicator 350 may be displayed in association with an anticipated command (e.g., when in automated mode for a section). The logic trigger indicator 350 may be displayed below the second command 320 (as the second command 320 is the anticipated command).

For instance, the guidance panel program may use the guidance panel rules to access the configuration state; determine the current mode of the section; if the current mode is AUTO, retrieve the next command value and/or the next command logic for the section from the configuration state; determine a triggering logic for the next command value and/or the next command logic based on the FMS data; and display a corresponding text-string for the triggering logic as the logic trigger indicator 350. For example, the guidance panel program may currently be limiting the speed to 250 knots until the aircraft exceeds 10,000 feet; in that case, the triggering logic would be the 10,000 feet. As depicted in FIG. 3C, the triggering logic may be a speed limit until the aircraft reaches 400 feet altitude. In some cases, the triggering logic may be a time, a location, a waypoint, a bearing, a heading, etc.

Figure 3D:
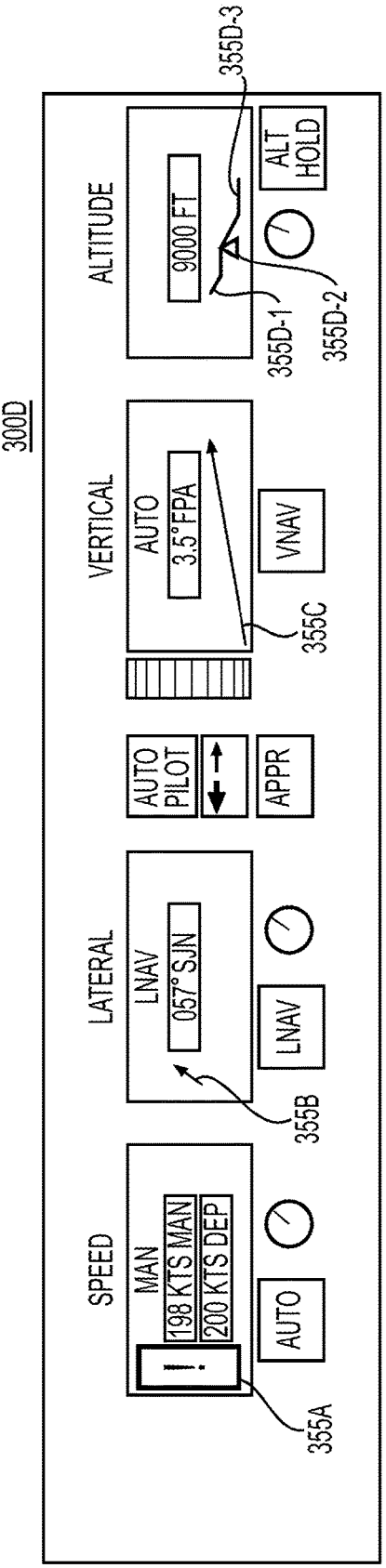

FIG. 3D depicts another embodiment of a GUI 300C consistent with certain additional embodiments of the present disclosure. The GUI 300D may be similar to GUI 300A except that GUI 300D may also or alternatively include one or more indicators from among a prompt indicator 355A, a lateral guide indicator 355B, an ascent or descent guide indicator 355C, and/or a guide indicator 355D (including first guide indicator 355D-1, second guide indicator 355D-2, and/or third guide indicator 355D-3).

In one aspect of the disclosure, the prompt indicator 355A may indicate that a system action is needed in relation to a mode, a command value, or a command logic of a guidance section. Specifically, the prompt indicator 355A may indicate a warning, a command, or a notice. The warning, the command, or the notice may be that a system action is required relating to the section with the prompt indicator 355A. For example, a datalink message may be received instructing the aircraft to attain a different speed. In this case, the prompt indicator 355A may be displayed in conjunction with the speed guidance section, to prompt the pilot to go to the respective system (e.g., external to the speed guidance section) and take appropriate action.

In one aspect of the disclosure, the prompt indicator 355A may indicate a no-intercept condition of a command value of a guidance section. Specifically, the prompt indicator 355A may indicate that a user-selected armed command value or user entered active command is not able to be attained by the system. For example, the user may have selected the system to a speed of 0.92 Mach, but the aircraft can only attain 0.89 Mach; the user may have commanded the system to attain an altitude of 45,000 feet, but the aircraft is not able to climb; or the user entered a heading that will not intersect a given waypoint.

The lateral guide indicator 355B may graphically indicate a difference between a user-entered command value of the active command 315 from a current command value based on the FMS data for the lateral guidance section. The lateral guide indicator 355B may be an arrow (as depicted in FIG. 3D) that proportionally reflects a difference between a first lateral heading and a second lateral heading. For instance, the first lateral heading may be a vertical line (not depicted in FIG. 3D) and corresponding to the current command value based on the FMS data. The second lateral heading (depicted in FIG. 3D) may correspond to the user-entered command value of the active command 315. Alternatively, the lateral guide indicator 355B may be an arrow on a compass. The current command value based on the FMS data may be marked on the compass and the arrow may correspond to the user-entered command value of the active command 315. Alternatively, the lateral guide indicator 355B may be two arrows, with the second arrow corresponding to the current command value based on the FMS data.

The ascent or descent guide indicator 355C may graphically indicate an ascent or descent rate for a section. The ascent or descent guide indicator 355C may be an arrow that that proportionally reflects a difference between the ascent or descent rate and level flight. The level flight may be a horizontal line (not depicted in FIG. 3D). The ascent or descent rate (depicted in FIG. 3D) may correspond to a user-entered command value of the active command 315 or the current command value based on the FMS data. The ascent or descent guide indicator 355C may be associated with the vertical guidance section and/or the altitude guidance section, based on the active command 315.

The guide indicator 355D (including the first guide indicator 355D-1, the second guide indicator 355D-2, and/or the third guide indicator 355D-3) may depict a change in flight path, as based on a floor requirement or a ceiling requirement. The floor requirement or the ceiling requirement may be determined as discussed above with respect to FIG. 3B. Specifically, the user may enter a change in the flight path to descend or ascend to a certain altitude or at a certain rate, but the change in the flight path may exceed the floor requirement or the ceiling requirement. The guidance panel program may determine that the change exceeds the floor requirement or the ceiling requirement at a certain point on the flight path, and generate and display the guide indicator 355D to inform the user that the change is invalid and/or the change has been modified to confirm to the floor requirement or the ceiling requirement. The first guide indicator 355D-1 may depict the flight path from the current position/altitude to the floor requirement or ceiling requirement, then level flight until the floor requirement or ceiling requirement no longer applies. The second guide indicator 355D-2 may depict the floor requirement or ceiling requirement. The third guide indicator 355D-3 may depict the flight path from the floor requirement or ceiling requirement to a set altitude (if set), then level flight until the floor requirement or ceiling requirement no longer applies. The first guide indicator 355D-1, the second guide indicator 355D-2, and/or the third guide indicator 355D-3 may be depicted in different colors (for instance corresponding to the first color, the second color, or the third color) to depict (1) how the change violates the floor requirement or the ceiling requirement and/or (2) how the change has been modified to confirm the floor requirement or the ceiling requirement.

Figure 3E:
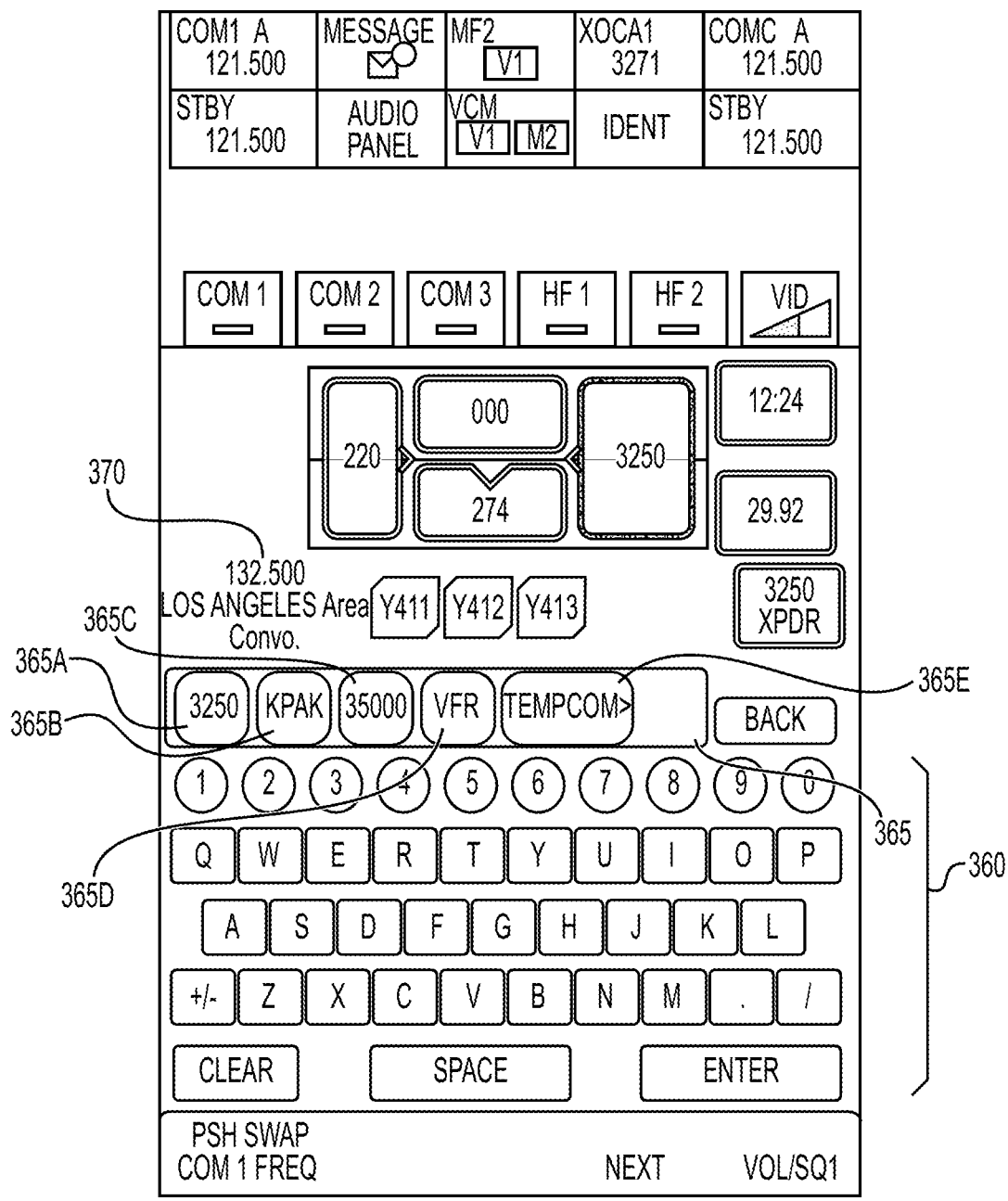

FIG. 3E depicts another embodiment of a GUI 300E consistent with certain additional embodiments of the present disclosure. The GUI 300E may depict a scratch-pad GUI that may be used in the scratch-pad input process. The scratch-pad GUI and associated functions may be performed in accordance with a scratch-pad program. The scratch-pad program may be a part of the guidance panel program or may be separate from the guidance panel program. The GUI 300E may include a user text input section 360, scratch-pad section 365, and/or a ribbon 370.

The ribbon 370 may correspond to the guidance ribbon discussed above. However, the ribbon 370 may correspond to some other system function. Further, the GUI 300E may not be displayed on the same touch screen/display as the guidance ribbon discussed above, but may instead be displayed on a user input touch screen (e.g., such as the control touch screen display 36) while the guidance ribbon is displayed on a different touch screen.

The user text input section 360 may be a touch screen input function area. For instance, the user text input section 360 may have different configurations to enter alphanumeric text-strings (e.g., letters and/or numerals). The user text input section 360 may also include a display section for the entered string, a back space button to delete individual letters and/or numerals, and/or a clear button to clear an entered text numbers or text input.

Scratch-pad section 365 may include one or more icons. The icons may include a user input icon 365A, a system-suggested text icon 365B, a system-suggested value icon 365C, a system-suggested function icon 365D, and/or a default icon 365E.

The user input icon 365A may display a user entered text-string, as input by the user text input section 360, or by user inputs to a keyboard, or by user-input by a speech-to-text function. For instance, in response to a user input (e.g., on a speech-to-text icon on the scratch-pad GUI or a button in the cockpit 20), the processor may perform a speech-to-text process of the scratch-pad program. The speech-to-text process may include: the processor may enable a microphone to receive audio, in response to the user input; the microphone may receive the audio, convert the audio into analog or digital signals, and transmit the analog or digital signals to the system; the processor may receive the analog or digital signals, process the signals using speech-to-text software, and input the text into the user-input icon 365A.

The system-suggested text icon 365B, the system-suggested value icon 365C, the system-suggested function icon 365D, and/or the default icon 365E may be suggested items for use by the user. For instance, the scratch-pad program may include suggestion rules. The suggestion rules may associate user inputs with flight deck interactions. For instance, the user may have selected one of the manual value controller 325/333 or input a user input on a region associated with the guidance sections (or a sub-region of the guidance section associated with the label 305, the mode 310, or the active command 315), and the suggestion rules may provide common items (e.g., values, modes, actions) that are likely to be of use to the user. Specifically, the suggestion rules may determine a situation from among a plurality of situations based on the phase of flight, current waypoint, action to be taken from a checklist program, or state of the aircraft as based on the flight path data. The plurality of situations may be associated with common items. Based on the situation, the suggestion rules may retrieve the common items associated with the situation, and present the common items as the system-suggested text icon 365B, the system-suggested value icon 365C, the system-suggested function icon 365D, and/or the default icon 365E. The suggestion rules and the common items associated with the plurality of situations may be define by the OEM and/or may be modified by owners/operators of the aircraft.

The scratch-pad input process may change a command value or mode of the guidance panel display. For instance, in one aspect of the disclosure, the scratch-pad input process may be initiated by the first input on one of the manual value controller 325/333. Specifically, the scratch-pad input process may include receiving the first input on one of the manual value controller 325/333. The scratch-pad input process may further include, in response to receiving the first input, updating the scratch-pad section 365. The updating the scratch-pad section 365 may include receiving user input(s) to enter text into the user input icon 365A and/or updating the system-suggested text icon 365B, the system-suggested value icon 365C, the system-suggested function icon 365D, and/or the default icon 365E of scratch-pad section 365 based on the situation. The scratch-pad input process may further include receiving the second input to select one of the user input icon 365A (as updated above) or one of the system-suggested text icon 365B, the system-suggested value icon 365C, the system-suggested function icon 365D, and/or the default icon 365E. The scratch-pad input process may further include receiving a selection based on another first input on the one of the manual value controller 325/333, or on a section of the guidance panel, and based on the selection, updating a current command value or mode of the section.

In another aspect of the disclosure, the scratch-pad input process may be initiated by user input on the scratch-pad GUI. Specifically, the scratch-pad input process may include receiving the user input on the scratch-pad GUI. The scratch-pad input process may further include, in response to receiving the user input on the scratch-pad GUI, updating the scratch-pad section 365. The updating the scratch-pad section 365 may include receiving user input(s) to enter text into the user input icon 365A and/or updating the system-suggested text icon 365B, the system-suggested value icon 365C, the system-suggested function icon 365D, and/or the default icon 365E of scratch-pad section 365 based on the situation. The scratch-pad input process may further include receiving the second input to select one of the user input icon 365A (as updated above) or one of the system-suggested text icon 365B, the system-suggested value icon 365C, the system-suggested function icon 365D, and/or the default icon 365E. The scratch-pad input process may further include receiving a selection based on the first input on the one of the manual value controller 325/333, or on a section of the guidance panel, and based on the selection, updating a current command value or mode of the section.

FIG. 4 depicts a flowchart for managing vehicle guidance using a GUI, according to one or more embodiments. The flowchart 400 may depict a method. The method may include, by a system with a processor, memory, and touch screen: obtain FMS data (block 402). The processor may receive the FMS data from the FMS 205.

The method may proceed to update a configuration state based on the FMS data, if the FMS data has updated information (block 404). The processor may determine if the FMS data has updated information if there are a difference in modes, command values, or command logics between the configuration state and the FMS data. If there are, the differences may be updated in the configuration state.

The method may proceed to obtain current mode, active command, and a second command for a guidance panel from the configuration state (block 406). The processor may determine the second command based on the current mode, as discussed above with respect to FIGS. 3A-3E.

The method may proceed to generate a Guidance Panel GUI based on current mode, active command, and a second command (block 408). The processor may generate the Guidance Panel GUI, as discussed above with respect to FIGS. 3A-3E. If the processor has already generated a Guidance Panel GUI, the processor may generate updates instead and change the already generated Guidance Panel GUI based on the updates.

The method may proceed to determine whether a user input has been received (block 410). The touch screen may detect user inputs, or another user interface may receive inputs, and the user inputs may transmitted to the processor. The processor may determine if a user input has been received by receiving the user inputs.

If no user input is received (block 410: No), the method may continue to wait until the first user input is received (block 410) or if a pre-define period of time has elapsed the method may proceed to obtain the FMS data (block 402).

If a user input is received (block 410: Yes), the method may proceed to determine whether the user input changes the active command (block 412). The processor may determine whether the user input changes the active command by determining whether a change from an automated mode and to a manual modes has been input by the user or by determining whether the second command has been selected, as discussed above with respect to FIGS. 3A-3E.

If not (block 414: No), the method may proceed to perform a second action based on the user input (block 416). Then (not depicted), the method may proceed to obtain the FMS data (block 402).

If the user input changes the active command (block 414: Yes), the method may proceed to perform a first action based on user input (block 414). Then (not depicted), the method may proceed to obtain the FMS data (block 402).

The first action may be one of: (1) make the active command a user-entered active command; or (2) make the active command an armed command or a possible command.

The second action may some other interaction with a GUI (e.g., inputs to clear the prompt indicator 355A).

Figure 5:
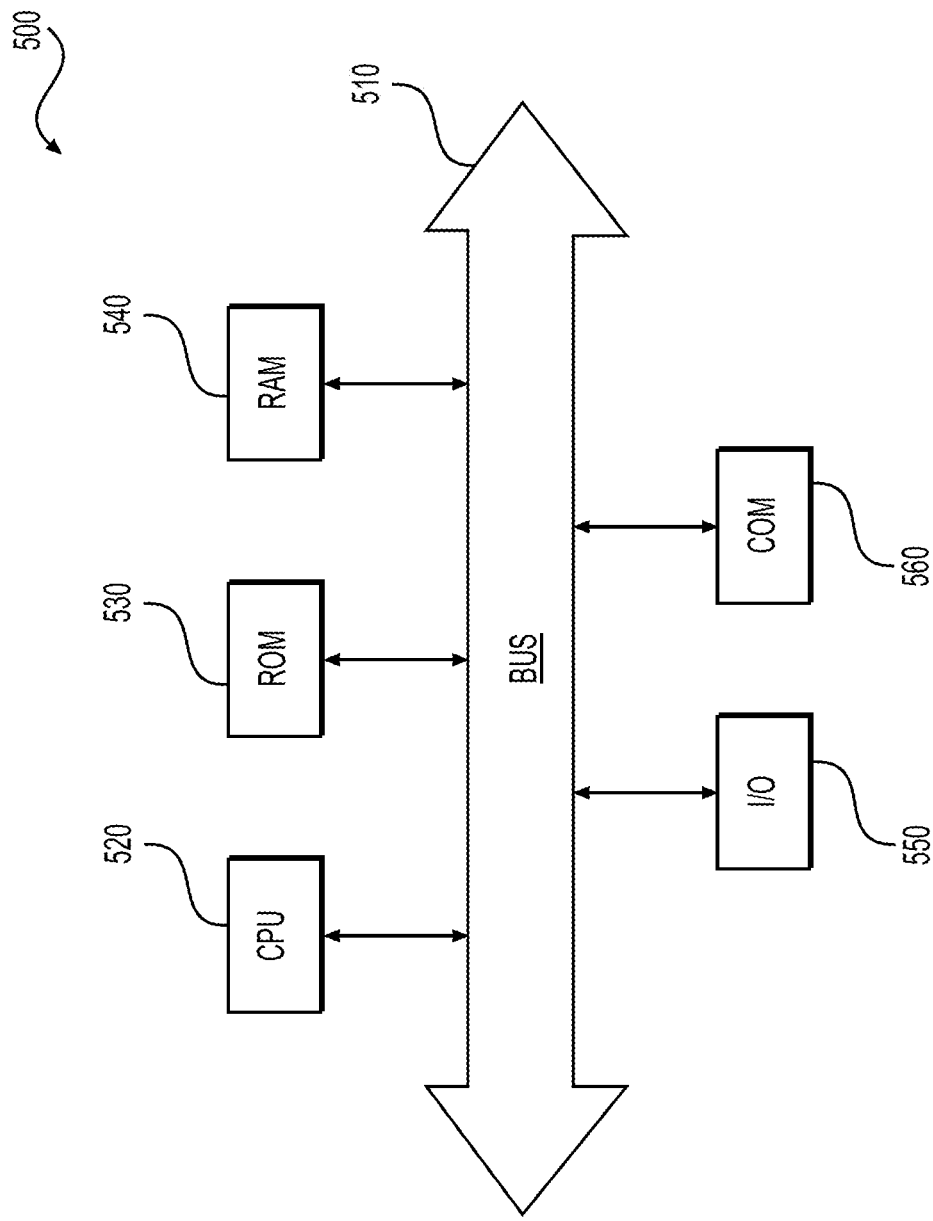
FIG. 5 depicts an example computing system configured to execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semi-conductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing vehicle guidance using a graphical user interface (GUI) of a vehicle, comprising:
   updating a vehicle configuration state based on vehicle data associated with a vehicle that has updated vehicle information;
   determining, based on the updated vehicle configuration state, for a vehicle speed, a stored current mode and an active command;
   determining whether the stored current mode for the vehicle speed is a manual mode or an automatic mode;
   in response to determining the stored current mode for the vehicle speed is a manual mode:
      extracting a current command value and a current command logic for the vehicle speed, and
      setting the extracted current command value and the extracted current command logic as a second command for the vehicle speed;
   generating first graphical depictions of the stored current mode, the active command, and the second command for the vehicle speed;
   determining, based on the updated vehicle configuration state, for a vehicle heading, a stored current mode and an active command;
   determining whether the stored current mode for the vehicle heading is a manual mode or an automatic mode;
   in response to determining whether the stored current mode for the vehicle heading is a manual mode or an automatic mode, extracting a command value and a command logic for the vehicle heading and setting the second command for the vehicle heading based upon the command value, the command logic and the stored current mode for the vehicle heading;
   generating second graphical depictions of the stored current mode, the active command, and the second command for the vehicle heading; and
   displaying the first and second graphical depictions adjacent to each other on a guidance panel GUI of the vehicle.

2. The method of claim 1, wherein in response to determining the stored current mode for the vehicle heading is the manual mode for the vehicle heading:
   extracting a current command value as the command value and a current command logic as the command logic for the vehicle heading, and
   setting the extracted current command value and the extracted current command logic as the second command for the vehicle heading;

in response to determining the stored current mode for the vehicle heading is the automatic mode for the vehicle heading:
   extracting a future command value as the command value and a future command logic as the command logic for the vehicle heading, and setting the extracted future command value and the extracted future command logic as the second command for the vehicle heading.

3. The method of claim 1, further comprising:
   obtaining, for a vehicle altitude, a stored current mode, an active command, and a second command; and
   generating third graphical depictions of the stored current mode, the active command, and the second command for the vehicle altitude.

4. The method of claim 3, further comprising displaying the first, second, and third graphical depictions adjacent to each other on the guidance panel GUI.

5. The method of claim 1, wherein the second command for the vehicle speed is an anticipated command, an armed command, or a possible command for the vehicle speed.

6. The method of claim 1, further comprising in response to determining the stored current mode for the vehicle speed is an automatic mode:
   extracting a future command value and a future command logic for the vehicle speed, and
   setting the extracted future command value and the extracted future command logic as the second command for the vehicle speed.

7. The method of claim 1, wherein the first graphical depictions and the second graphical depictions are further displayed in an ordered sequence and in a horizontal direction, a vertical direction, or a grid pattern, further comprising:
   based on user interactions with the guidance panel GUI, changing a current mode and command by selecting the second command.

8. A system for managing vehicle guidance using a graphical user interface (GUI) of a vehicle, the system comprising:
   a guidance panel;
   a memory storing instructions; and
   a processor executing the instructions to perform a process including:
      obtaining vehicle data;
      updating a vehicle configuration state based on the vehicle data if the vehicle data has updated information;
      determining, based on the vehicle configuration state, for a vehicle speed, a stored current mode and an active command;
      determining whether the stored current mode for the vehicle speed is a manual mode or an automatic mode;
      in response to determining the stored current mode for the vehicle speed is a manual mode:
         extracting a current command value and a current command logic for the vehicle speed, and
         setting the extracted current command value and the extracted current command logic as a second command for the vehicle speed;
      generating first graphical depictions of the stored current mode, the active command, and the second command for the vehicle speed;
      determining, based on the vehicle configuration state, for a vehicle heading, a stored current mode and an active command;

determining whether the stored current mode for the vehicle heading is a manual mode or an automatic mode;

in response to determining whether the stored current mode for the vehicle heading is a manual mode or an automatic mode, extracting a command value and a command logic for the vehicle heading and setting the second command for the vehicle heading based upon the command value, the command logic and the stored current mode for the vehicle heading;

generating second graphical depictions of the stored current mode, the active command, and the second command for the vehicle heading; and displaying the first and second graphical depictions adjacent to each other on a guidance panel GUI of the vehicle.

9. The system of claim 8, wherein in response to determining the stored current mode for the vehicle heading is the manual mode for the vehicle heading:

extracting a current command value as the command value and a current command logic as the command logic for the vehicle heading, and setting the extracted current command value and the extracted current command logic as the second command for the vehicle heading;

in response to determining the stored current mode for the vehicle heading is the automatic mode for the vehicle heading:

extracting a future command value as the command value and a future command logic as the command logic for the vehicle heading, and setting the extracted future command value and the extracted future command logic as the second command for the vehicle heading.

10. The system of claim 8, further comprising:

obtaining, for a vehicle altitude, a current mode, an active command, and a second command; and generating third graphical depictions of the stored current mode, the active command, and the second command for the vehicle altitude.

11. The system of claim 10, further comprising displaying the first, second, and third graphical depictions adjacent to each other on the guidance panel GUI.

12. The system of claim 8, wherein the second command for the vehicle speed is an anticipated command, an armed command, or a possible command for the vehicle speed.

13. The system of claim 8, further comprising in response to determining the stored current mode for the vehicle speed is an automatic mode:

extracting a future command value and a future command logic for the vehicle speed, and setting the extracted future command value and the extracted future command logic as the second command for the vehicle speed.

14. The system of claim 8, wherein the first graphical depictions and the second graphical depictions are further displayed in an ordered sequence and in a horizontal direction, a vertical direction, a grid pattern, further comprising:

based on user interactions with the guidance panel GUI, changing a current mode and command by selecting the second command.

15. A non-transitory computer-readable medium storing instructions that, when executed by a processor, cause the processor to perform a method for managing vehicle guidance using a graphical user interface (GUI) of a vehicle, the method comprising:

obtaining vehicle data;

updating a vehicle configuration state based on the vehicle data if the vehicle data has updated information;

determining, based on the vehicle configuration state, for a vehicle speed, a stored current mode and an active command;

determining whether the stored current mode is a manual mode or an automatic mode;

in response to determining the stored current mode is a manual mode:

extracting a current command value and a current command logic for the vehicle speed, and setting the extracted current command value and the extracted current command logic as a second command for the vehicle speed;

generating first graphical depictions of the stored current mode, the active command, and the second command for the vehicle speed;

determining, based on the vehicle configuration state, for a vehicle heading, a stored current mode and an active command;

determining whether the stored current mode for the vehicle heading is a manual mode or an automatic mode;

in response to determining whether the stored current mode for the vehicle heading is a manual mode or an automatic mode, extracting a command value and a command logic for the vehicle heading and setting the second command for the vehicle heading based upon the command value, the command logic and the stored current mode for the vehicle heading;

generating second graphical depictions of the stored current mode, the active command, and the second command for the vehicle heading; and displaying the first and second graphical depictions adjacent to each other on a guidance panel GUI of the vehicle.

16. The non-transitory computer-readable medium of claim 15, wherein in response to determining the stored current mode for the vehicle heading is the manual mode for the vehicle heading:

extracting a current command value as the command value and a current command logic as the command logic for the vehicle heading, and setting the extracted current command value and the extracted current command logic as the second command for the vehicle heading;

in response to determining the stored current mode for the vehicle heading is the automatic mode for the vehicle heading:

extracting a future command value as the command value and a future command logic as the command logic for the vehicle heading, and setting the extracted future command value and the extracted future command logic as the second command for the vehicle heading.

17. The non-transitory computer-readable medium of claim 15, further comprising: obtaining, for a vehicle altitude, a stored current mode, an active command, and a second command; and generating third graphical depictions of the stored current mode, the active command, and the second command for the vehicle altitude.

18. The non-transitory computer-readable medium of claim 17, further comprising displaying the first, second, and third graphical depictions adjacent to each other on the guidance panel GUI.

19. The non-transitory computer-readable medium of claim 15, further comprising in response to determining the stored current mode for the vehicle speed is an automatic mode:
- extracting a future command value and a future command logic for the vehicle speed, and
- setting the extracted future command value and the extracted future command logic as the second command for the vehicle speed.

20. The non-transitory computer-readable medium of claim 15, wherein the first graphical depictions and the second graphical depictions are further displayed in an ordered sequence and in a horizontal direction, a vertical direction, or a grid pattern, further comprising: based on user interactions with the guidance panel GUI,
- changing a current mode and command by selecting the second command.

\* \* \* \* \*